Patented Apr. 13, 1948

2,439,505

UNITED STATES PATENT OFFICE 2,439,505

POLYFLUORINATED ACRYLONITRILES

David W. Chaney, Nether Providence Township, Delaware County, Pa., assignor to American Viscose Corporation, Wilmington, Del., a corporation of Delaware No Drawing. Application June 28, 1946, Serial No. 680,054

7 Claims. (Cl. 260—464)

This invention relates to new polyfluorinated acrylonitriles, and to methods for producing them.

I have found that when the hydrogen atoms of acrylonitrile are replaced by fluorine, and in the case of the hydrogen attached to the alpha-carbon by fluorine or chlorine, the resulting products exhibit properties which are not possessed by acrylonitrile itself, or by other mono-olefinic type compounds such as the simple alkylenes or derivatives thereof of the type of di- or trichlorethylene, or even symmetrical difluoroethylene. Thus, the new products are highly reactive and react spontaneously with the primary alcohols, in the absence of a catalyst and under ordinary temperature and pressure conditions, to form a new series of saturated ethers, via addition to the double bond.

The new acrylonitrile derivatives of formula $$CF_2=CXCN$$

where X is chlorine or fluorine, with which the present invention is concerned, are liquids which may be used as such for various industrial purposes, as for example, as solvents, toxicants, insecticides, etc., or as intermediates in various chemical processes for the production of other valuable compounds, for example as intermediates for the saturated ethers mentioned above.

The new products may be produced from corresponding chlorofluoro-propylenes of the general formula $$CF_2ClCX=CCl_2$$

where X is chlorine or fluorine, by a method involving oxidation of the selected propylene to the corresponding propionyl chloride, conversion of the chloride to the corresponding amide, dehydration of the amide to the corresponding nitrile, and selective dechlorination of the nitrile to obtain the desired acrylonitrile derivative.

Preferably, the propylene is oxidized under the influence of actinic radiation by passing a stream of oxygen, which may be diluted with a small quantity of chlorine as a catalyst for the oxidation reaction, into an internally irradiated reaction vessel containing the propylene and equipped with suitable stirring means, the reaction being continued until the corresponding propionyl chloride is formed, as indicated by a marked diminution of the rate at which the oxygen is absorbed, the reaction time varying, generally speaking, from 50 hours to, say, about 120 hours, depending upon the propylene oxidized and other conditions, such as the efficiency of stirring, etc.

The temperature at which the oxidation reaction is effected may vary somewhat, depending upon the boiling point of the propylene and the solubilities of the gases, which decrease with increasing temperatures, but is preferably maintained within the range of from about 30° C. to 80° C., and the vessel is externally cooled to dissipate the heat of the actinic radiation source.

The oxidation product is a liquid which comprises the propionyl chloride and an oxide which is believed to have the formula

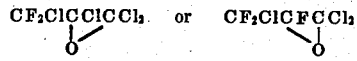

The reaction mixture also usually comprises some unoxidized fluorochloropropylene and other impurities. In addition to the propionyl chloride, in certain cases the reaction mixture also comprises a propionyl fluoride.

The oxide present in the reaction mixture may be converted to the acid chloride by treatment with an amine of the type of pyridine.

The acid chloride may be separated from the other constituents of the reaction mixture by subjecting the liquid oxidation product to distillation at reduced pressures. Preferably, however, the acid chloride is converted to the corresponding propionamide without separation or purification thereof.

Conversion of the crude acid chloride to the corresponding propionamide may be effected by passing dry ammonia into the liquid reaction product, preferably after dilution of the latter with ether, desirably with constant stirring and cooling.

After filtering off the insoluble ammonium salts which are formed, dehydration to the propionitrile may be effected by heating a mixture of the amide with phosphorous pentoxide or a similar dehydrating agent and distilling off the nitrile.

The propionitrile may be selectively dechlorinated to the desired $\beta,\beta$-difluoroacrylonitrile to remove two atoms of chlorine.

The following examples in which the parts are by weight, are illustrative of the invention:

Example I

A reaction vessel was used consisting of a three-neck flask equipped with a stirring device, thermometer, gas inlet, reflux condenser, and an 80 watt mercury vapor lamp encased in a quartz tube extending into the reaction mixture.

About 1160 parts of 1,1,2,3-tetrachlor-3,3-difluoropropene-1, $(CF_2ClCCl=CCl_2)$ were placed in the flask, and a mixture of oxygen and chlorine in a ratio of approximately 10:1 was passed into the flask, with constant stirring.

The reaction mixture was maintained at a temperature of about 50 to 80° C. by externally cooling the flask with running water. In about 90 hours, the rate of absorption of the gases dropped to about 10 ml./min. and the reaction was terminated. The reaction product was a liquid comprising $\alpha,\alpha$ - dichloro - $\beta,\beta$ - difluorochloropropionyl chloride ($CF_2ClCCl_2COCL$) and the oxide

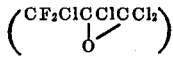

The acid chloride was converted to the amide by diluting about 500 parts of the crude reaction product with about 250 parts of dry ether, and passing dry ammonia into the mixture. The mixture was maintained at a temperature below 20° C. by cooling with ice water with continuous stirring. After completion of the reaction, the insoluble ammonium salts which had separated were filtered off and repeatedly extracted with ether. Upon evaporation of the combined ether filtrate and extracts, a sticky solid separated (about 250 parts), which was further dried under vacuum. Upon distillation under vacuum, 155 parts of $\alpha,\alpha$-dichloro-$\beta,\beta$-difluorochloropropionamide ($CF_2ClCCl_2CONH_2$) were obtained, B. P. 135–148°/29 mm.; M. P. 57–58.5° C.

About 100 parts of the amide and 150 parts of phosphorous pentoxide, both in powdered form, were intimately mixed in a flask and heated to 150–160° C. in an oil bath. The nitrile was distilled off as it formed. After five hours, the temperature was permitted to rise to 210° C. 84 parts (92%) of the distillate were collected in a receiver cooled by ice, washed with sodium bicarbonate, dried over sodium sulfate, and distilled. The $\alpha,\alpha$ - dichloro - $\beta,\beta$ - difluorochloropropionitrile distilled at between 91 and 95° C., B. P. 95° C., freezing point, −32.5°, and refractive index, $N_D23°=1.3990$.

Twenty-nine parts of magnesium powder were reacted with 51 parts of iodine in 350 parts of butyl ether in a three-neck flask equipped with stirrer, thermometer, addition funnel and means for distilling off volatile products. The mixture was heated to 135° C., and about 117 parts of the nitrile were added slowly, sufficient heat being evolved to maintain a steady rate of distillation at between 120 and 135° C. About 220 parts of distillate were obtained upon completion of the nitrile addition. The distillate, which was composed largely of butyl ether and some $\alpha$-chloro-$\beta,\beta$-difluoroacrylonitrile was shaken with mercury to remove free iodine, filtered, and fractionally distilled. 25 parts of the forerun, B. P. 59 to 75° C., were collected and refractionated. The pure nitrile, $CF_2=CClCN$, had a boiling point of 63° C., $N_D24°=1.3793$ and $d^{24°}=1.3560$.

Example II

About 4,730 parts of 1,1,3-trichloro-2,3,3-trifluoropropene-1, ($CF_2ClCF=CCl_2$) were photoxidized in an apparatus as described in Example I and under the same conditions except that the temperature was maintained at about 35° C.

At the start of operations, the 10:1 mixture of oxygen and chlorine gases was absorbed at a rate of about 300 ml./min. In about 30 hours, the absorption rate decreased to about 50 ml./min. and the reaction was terminated.

The reaction mixture was freed of dissolved gas and low-boiling by-products by slowly heating it to about 50° C.

The crude reaction product was a liquid which comprised a mixture consisting primarily of $\alpha$-chloro-$\alpha$-fluoro - $\beta,\beta$ - difluorochloropropionyl chloride ($CF_2ClCFClCOCl$), the oxide

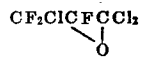

and, unexpectedly, $\alpha,\alpha$ - dichloro - $\beta,\beta$ - difluorochloropropionyl fluoride ($CF_2ClCCl_2COF$). It was then diluted with 1500 parts of dry ether, cooled to 10° C., and ammonia was passed in, with constant stirring. The temperature was maintained below 20° C. by external cooling. After about 8 to 10 hours, the insoluble ammonium halides formed were filtered off and thoroughly extracted with ether. The filtrate and ether extracts were combined and dried under vacuum, 2710 parts of a mixture of $\alpha$-chloro-$\alpha$-fluoro-$\beta,\beta$-difluorochloropropionamide and $\alpha,\alpha$-dichloro-$\beta$-difluorochloropropionamide being obtained.

About 100 parts of the mixed amides, in finely powdered form, were intimately mixed with 150 parts of powdered phosphorus pentoxide, in a round-bottom flask, and heated to about 160–180° C. in an oil bath. At that temperature, the product began to distil over and was collected in a receiver cooled by ice. The heating was continued for about 4 hours, the temperature being finally raised to 200° C. About 76 parts of crude distillate were obtained. The distillate was washed twice with ice water, dried over anhydrous sodium sulfate, and distilled. 22 parts distilled between 46 and 56° C. corresponding to 25% yield of $\alpha$-chloro-$\alpha$-fluoro-$\beta,\beta$-difluorochloropropionitrile ($CF_2ClCFClCN$), and 20 parts distilled between 90 and 97°, corresponding to 22% yield of $\alpha,\alpha$-dichloro-$\beta,\beta$-difluorochloropropionitrile ($CF_2ClCCl_2CN$).

In this case, the nitrile could not be selectively dechlorinated to the desired acrylonitrile derivative by the procedure described in Example I, and a special procedure was evolved, as follows:

About 65 parts of activated zinc dust suspended in 250 parts of acetic anhydride in a three-neck flask equipped with a stirrer, thermometer, reflux condenser, and addition funnel was heated to 70° C. 88 parts of $\alpha$-chloro-$\alpha$-fluoro-$\beta,\beta$-difluorochloropropionitrile were added dropwise. Gases were evolved and escaped through the condenser which was maintained at a temperature of 20° C. The gases were then condensed in a receiver cooled by dry ice. When the reaction was ¾ complete, it was found necessary to add 20 additional parts of zinc. The reaction mixture was finally heated to 125° C. 40 parts of distillate were collected, dried with calcium chloride, and fractionated. There were obtained 15 parts of an eutectic mixture of acetyl fluoride and $\alpha$ - fluoro-$\beta,\beta$-difluoroacrylonitrile ($CF_2=CFCN$) having a boiling range of 17.7 to 18° C., density at 10° C. of 1.312, and refractive index at 10° C. of 1.3162.

As an example of the production of unsaturated ethers from the difluorinated acrylonitriles of the invention, the following is given:

8.8 parts of $\alpha$-chloro-$\beta,\beta$-difluoroacrylonitrile ($CF_2=CClCN$) were added slowly to 18 parts of ethanol in an Erlenmeyer flask, with external cooling. After standing for about an hour at room temperature, the mixture was poured into 200 parts of water, and the oil which separated was drawn off, dried over anhydrous sodium sulfate and distilled at a pressure of 100 mm. 6.2 parts of ethyl difluorochloro-cyanoethyl ether (C$_2$H$_5$OCF$_2$CHClCN) were obtained—B. P. 93°/100 mm.

It will be apparent that various changes and modifications may be made in the specific examples given above without departing from the spirit and scope of the invention which is to be limited only by the spirit and scope of the appended claims.

I claim:
1. Fluorinated acrylonitrile derivatives having the formula

$$CF_2=CXCN$$

where X is selected from the group consisting of chlorine and fluorine.

2. α-chloro-β,β-difluoroacrylonitrile.
3. α-fluoro-β,β-difluoroacrylonitrile.
4. Method for the production of β,β-difluoroacrylonitriles having the formula $$CF_2=CXCN$$

where X is selected from the group consisting of chlorine and fluorine, which comprises oxidizing a propylene having the formula $$CF_2ClCX=CCl_2$$

where X is selected from the group consisting of fluorine and chlorine to the corresponding propionyl chloride, reacting the chloride with ammonia to convert the chloride to the corresponding propionamide, dehydrating the amide to the corresponding propionitrile, and removing two atoms of chlorine from the nitrile to obtain the β,β-difluoroacrylonitrile.

5. Method for the production of β,β-difluoroacrylonitriles having the formula $$CF_2=CXCN$$

where X is selected from the group consisting of chlorine and fluorine, which comprises oxidizing a propylene having the formula $$CF_2ClCX=CCl_2$$

where X is selected from the group consisting of fluorine and chlorine, under the influence of actinic radiation, to the corresponding propionyl chloride, reacting the chloride with ammonia to convert the chloride to the corresponding propionamide, dehydrating the amide to the corresponding propionitrile, and removing two atoms of chlorine from the nitrile to obtain the β,β-difluoroacrylonitrile.

6. Method for the production of α-fluoro-β,β-difluoroacrylonitrile which comprises oxidizing 1,1,3-trichloro-2,3,3-trifluoropropene-1 under the influence of actinic radiation to α-chloro-α-fluoro-β,β-difluorochloropropionyl chloride, reacting the chloride with ammonia to form α-chloro-α-fluoro-β,β-difluorochloropropionamide, dehydrating the amide to α-chloro-α-fluoro-β,β-difluorochloropropionitrile, and removing two atoms of chlorine from the nitrile to obtain α-fluoro-β,β-difluoroacrylonitrile.

7. Method for the production of α-chloro-β,β-difluoroacrylonitrile which comprises oxidizing 1,1,2,3-tetrachlor-3,3-difluoropropene-1 under the influence of actinic radiation to α,α-dichloro-β,β-difluorochloropropionyl chloride, reacting the chloride with ammonia to form α,α-dichloro-β,β-difluorochloropropionamide, dehydrating the amide to α,α-dichloro-β,β-difluorochloropropionitrile, and removing two atoms of chlorine from the nitrile to obtain α-chloro-β,β-difluoroacrylonitrile.

DAVID W. CHANEY.

REFERENCES CITED

The following references are of record in the file of this patent:

Boeseken et al. Rec. trav. Chim., vol. 32, pages 98–101, (1913).